United States Patent [19]

Hagshenas et al.

[11] Patent Number: 4,491,374
[45] Date of Patent: Jan. 1, 1985

[54] SCREW PUMP LUBRICATION SYSTEM

[75] Inventors: Behzad Hagshenas, Rockford; Donald W. Butler, Roscoe; Anson S. Coolidge, Rockford, all of Ill.

[73] Assignee: Sundstrand Corporation, Rockford, Ill.

[21] Appl. No.: 241,344

[22] Filed: Mar. 6, 1981

[51] Int. Cl.³ .................... F16C 33/66; F01D 25/20
[52] U.S. Cl. .................. 384/471; 184/6.11; 415/175
[58] Field of Search .............. 308/78, 187, 122, 127, 308/DIG. 15; 415/175, 169 A, 169 R; 417/407, 424, 241, 215, 368, 406; 184/64, 6.11, 61, 31; 62/133, 172, 186; 384/322, 403, 397, 404, 398, 414, 400

[56] References Cited

U.S. PATENT DOCUMENTS

| | | | |
|---|---|---|---|
| 1,789,861 | 10/1928 | Birmann | 415/17 |
| 2,916,980 | 7/1956 | Stein | 62/133 |
| 3,017,230 | 8/1957 | Meermans | 184/6.11 X |
| 3,243,241 | 12/1963 | Lindt et al. | 308/78 |
| 3,618,710 | 11/1971 | DeLisse | 184/6.11 |
| 4,233,821 | 11/1980 | DeSalve | 417/407 X |
| 4,285,632 | 8/1981 | DeSalve | 308/78 X |

FOREIGN PATENT DOCUMENTS

| | | | |
|---|---|---|---|
| 694710 | 7/1953 | United Kingdom | 308/122 |
| 585313 | 12/1977 | U.S.S.R. | 415/169 A |

Primary Examiner—Stuart S. Levy
Assistant Examiner—David Werner
Attorney, Agent, or Firm—Harold A. Williamson; Ted. E. Killingsworth; Michael B. McMurry

[57] ABSTRACT

This invention relates to a self-priming screw pump lubrication system. The system 10 includes a central feed tube which communicates at one end with lubricant in a reservoir or sump and at the other end to the central region of an assembly that includes a horizontally disposed rotating shaft. The shaft having thereon threaded portions of opposite pitch mounted within a pair of mating sleeves which sleeves are biased away from each other at the central region of the assembly. The other ends of the sleeves are in abutting relationship with the outer races of a pair of angular contact bearings to be lubricated. Each of the inner races of the bearings are mounted on the rotary shaft. Lubricant slingers are mounted on the rotating shaft at a point remote from the bearings and cooperate with the lubricant that has been drawn upward through the central feed tube and delivered to and past the bearings, whereupon the slingers propel the lubricant back to the reservoir for reuse.

4 Claims, 2 Drawing Figures

SCREW PUMP LUBRICATION SYSTEM

TECHNICAL FIELD

This invention relates to a self-priming high speed screw pump lubrication system.

BACKGROUND ART

Historically in high speed rotating shaft environments the use of screw pumps have proven to be reliable oil pumps when the screw pumps have been primed. Priming has presented a problem if the pumping has to be accomplished against a head of several inches. In the past this matter of priming has been handled by the addition of a capillary tube in an attempt to maintain the oil height at the screw thread regardless of the oil level in the housing that carries the high speed rotating shaft.

Typically the prior art lubrication system has included a wick that extends from a source of lubricant into contact with the rotating shaft of the assembly sought to be lubricated. The wick, screw pump and capillary volume was sealed using a labyrinth seal on the shaft. In order for the screw pump and capillary to function, the screw pump and capillary must be matched to accomplish the desired flow. The oil rise as a result of capillary action occurs at zero flow and is a result of the equilibrium between the vertical upward component of the surface tension and the weight of the oil in the capillary. Experience has revealed capillaries will typically provide a rise of about 1.25 inches minimum. In typical arrangements of this nature, in order to achieve desired flow, capillaries in parallel are required. This type of arangement is essentially unstable, unpredictable and susceptible to such factors as is assembly set up, oil viscosities and static inlet head. The invention to be described more fully hereinafter completely avoids the requirement for capillaries and the attendant problems just noted. U.S. Pat. No. 2,916,890 to C. R. Stien illustrates the wick type of lubrication system.

The patent to DeLisse, U.S. Pat. No. 3,618,710 is directed to a metering and scavenging pump wherein the lubrication system comprises a reservoir having a feed tube 26 which delivers lubricant to a pump 38 which may be of the screw pump type. The DeLisse patent however, provides no teaching of a lubrication system of the type to be described in respect of the subject invention where lubricant is delivered via a conduit to a control region where a pair of oppositely threaded portions of a shaft deliver oil to spring loaded bearings via sleeves mounted concentric to the shaft. Each of the bearings are on either side of the central region bearings.

The invention to be described hereinafter recognizes that opposed threaded portions on a shaft to deliver lubricant from a pair of opposite regions of a single sleeve bearing is basically old; for this is shown in British Pat. No. 694,910. The British Patent stores lubricant in a wick 32. Another patent of interest is that of Lindt et al, U.S. Pat. No. 3,243,241 which covers the idea of delivering lubricant from a central region to a bearing. Note in FIG. 1 of Lindt et al, that oil pumping groove 23 delivers lubricant from a lubricant storage wick 32 to a bearing 8. The prior art just reviewed does not show the inventive arrangement set forth in the specification that follows.

DISCLOSURE OF INVENTION

More specifically, this invention relates to a self-priming screw pump lubrication system. The system includes a central feed tube which communicates at one end with lubricant in a reservoir or sump and at the other end to the central region of an assembly that includes a horizontally disposed rotating shaft. The shaft having thereon threaded portions of opposite pitch mounted within a pair of mating sleeves which sleeves are biased away from each other at the central region of the assembly. The other ends of the sleeves are in abutting relationship with the outer races of a pair of angular contact bearings to be lubricated. Each of the inner races of the bearings are mounted on the rotary shaft. Lubricant slingers are mounted on the rotating shaft at a point remote from the bearings and cooperate with the lubricant that has been drawn upward through the central feed tube and delivered to and past the bearings, whereupon the slingers propel the lubricant back to the reservoir for reuse.

It is therefore a primary object of the invention to provide a lubrication system for high speed spring loaded bearing pairs located on the same shaft, which bearing pairs are provided with a lubricant delivering conduit to a central region between the bearings in conjunction with a pair of concentric sleeves in contact with the bearings and biased apart from the central region.

Another object of the invention is to provide a high speed screw pump lubrication system that does not require the use of lubricant carrying wick or capillaries.

Yet another object of the invention is to provide a high speed self-priming screw pump lubrication system.

In the attainment of the foregoing objects, the invention contemplates a self-priming high speed screw pump lubrication system that includes in combination a rotary shaft mounted in the inner races of a pair of spaced apart bearings to be lubricated. The outer races of the bearing pair are positioned against the inner surface of a tubular member fitted in a housing.

First and second concentric sleeves are positioned on the rotary shaft and are located between the bearings. The sleeves which are spaced apart form a lubrication chamber, which chamber is established by the rotary shaft, the sleeves and the tubular member. A conduit is coupled to and through the tubular member and has one end in communication with the lubrication chamber and the other end in communication with a source of lubricant.

Each of the aforementioned sleeves have an end portion thereof formed such that the sleeve only contacts the outer race of the bearings to be lubricated. There is also provided a biasing means positioned between the sleeves to thereby force the sleeves against the outer bearing races.

The rotary shaft includes oppositely threaded surfaces thereon in the region of the sleeves. The threaded portions act in cooperation with the sleeves upon rotation of the rotary shaft and thereby act as a screw pump to draw lubricant from the source of lubricant through the conduit into the lubrication chamber and thence between the rotary shaft and the sleeves to the bearings to be lubricated. The invention also contemplates that the rotary shaft will have positioned thereon a pair of bladed oil slingers at a point adjacent to the bearings, which slingers will be located on the side of the bearing opposite to the direction of the lubricant flow. The oil slingers are located within the tubular member and are concentrically mounted in respect to the rotary shaft. The tubular element is provided with a pair of openings each adjacent the pair of oil slingers to thereby allow the return of lubricant to the lubricant source in the housing after the lubricant has passed through the bearings and lubricated the same.

In the preferred embodiment of the invention, the diameter of the rotary shaft having the threaded portions is greater than the diameter of the rotary shaft passing through the inner races of the pair of bearings. The tubular member in the preferred embodiment is resiliently mounted in the housing to thereby isolate the lubrication system and the rotary shaft from the housing as the rotary shaft operates over a range of speeds.

Other objects and advantages of the present invention will be apparent upon reference to the accompanying description when taken in conjunction with the following drawings:

BEST MODE FOR CARRYING OUT THE INVENTION

Figure 1:
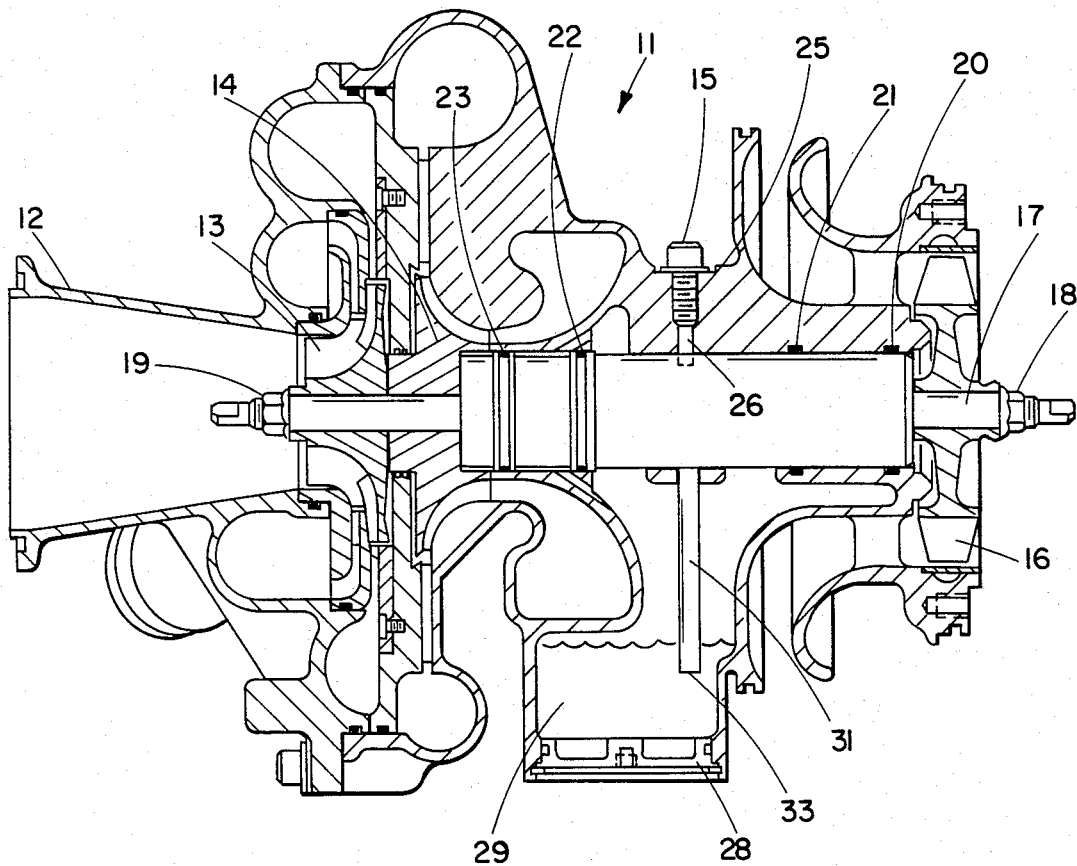
FIG. 1 is a full cross-sectional view of a high speed turbomachine in which the invention finds utility.

Reference is now made to FIG. 1 which illustrates a high speed rotary machine 11. The high speed rotary machine 11 provides a typical environment in which the invention to be described more fully hereinafter finds utility. The high speed rotary machine 11 includes a turbine housing 12 and has shown illustrated mounted therein a turbine wheel 13, compressor wheel 14 and a fan 16, each respectively mounted on a rotary turbine shaft 17. Self locking nuts 18 and 19 are secured to the ends of the shaft 17 to hold the turbine wheel 13, compressor wheel 14 and fan 16 in place thereon. Centrally disposed in the turbine housing 12 is a tubular cartridge 24 that contains the invention. The tubular cartridge 24 is mounted in the housing 12 on resilient performed packing members 20, 21, 22 and 23. These resilient performed packing members 20, 21, 22 and 23 provide a resilient mounting for the cartridge 24 in the housing 12 to thereby isolate the lubrication system contained in the cartridge 24 and the rotary shaft 17 which passes therethrough from the housing 12 as the rotary shaft 17 operates over a range of speeds. A center pin 15 having a threaded portion 25 and an unthreaded portion 26 is threaded into the housing 12 as shown. The unthreaded portion 26 fits in opening 30 (FIG. 2) of tubular cartridge 24 and prevents axial movement of the cartridge 24. The tubular chamber 24 has shown extending therefrom, a lubricant supply conduit 31 with a conduit end 33 communicating with a lubricant source or reservoir 29 in the bottom of the housing 12. A sump plug 28 is fitted in the housing 12 and its removal would drain lubricant from the housing.

Figure 2:
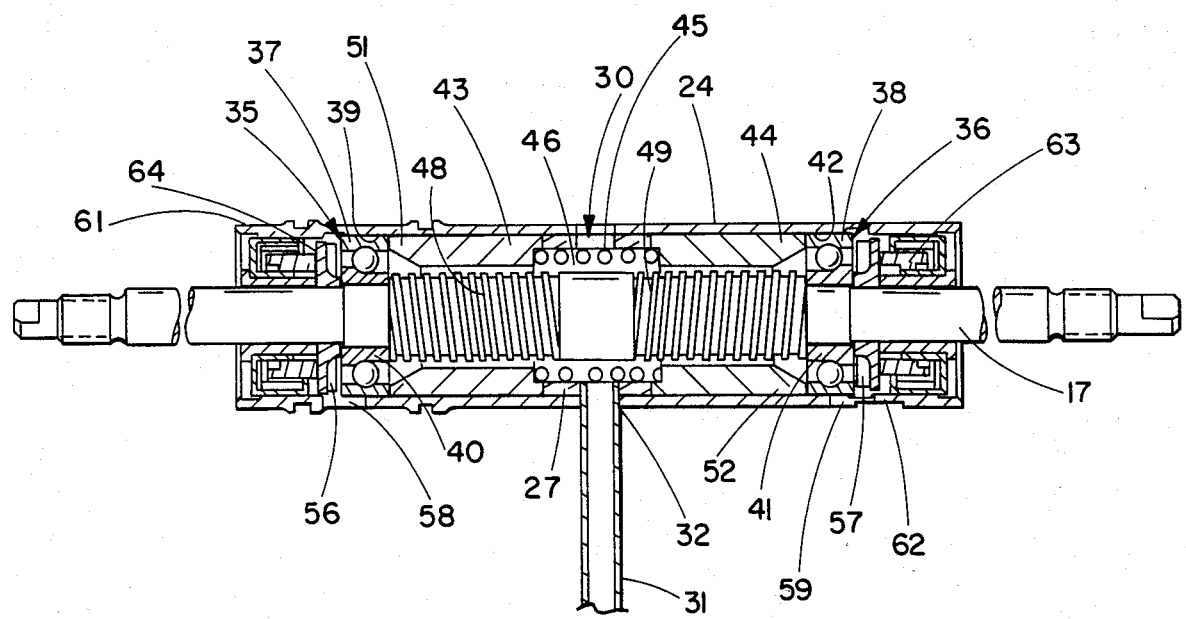
FIG. 2 is a cross section of the preferred embodiment of a self-priming high speed screw pump lubrication system containing the invention.

Reference is now made to FIG. 2 which illustrates in cross section the tubular chamber 24 that contains the preferred embodiment of the invention. As can be seen, a rotary shaft 17 extends longitudinally through the tubular housing 24. The rotary shaft 17 is mounted in inner races 40, 41 of bearings 35, 36. These bearings 35 and 36 are the bearings that are to be lubricated by the self-priming high speed screw pump lubrication system to be described in more detail hereinafter. The outer races 37, 38 of the bearing pair 35, 36 are positioned against the inner surface at points 39 and 42 of the tubular cartridge 24.

First and second concentric sleeves 43 and 44 are positioned as shown on the rotary shaft 17. The sleeves 43 and 44 are spaced apart and thereby create a lubrication chamber 46 formed by the rotary shaft 17, the end of sleeves 43, 44 and the tubular member 24. A helical compression spring 45 is shown concentrically mounted about rotary shaft 17 and engaging the inner ends of sleeves 43, 44. The helical compression spring 45 resiliently biases the sleeves 43, 44 such that sleeve end portions 51, 52 engage outer races 37, 38 of the bearing pair 35, 36. A lubricant supply conduit 31 is shown having a threaded engagement 32 with tubular member 24 and tubular insert 27. As was noted with respect to FIG. 1, the lubricant supply conduit 31 has one end thereof in communication with a source of lubricant 29.

In the preferred embodiment the rotary shaft 17 has oppositely threaded surfaces 48, 49 present on portions of the rotary shaft 17 which have a diameter greater than the diameter of the rotary shaft 17 passing through the inner races 40, 41 of the bearings 35, 36. The threaded surfaces 48, 49 cooperate with the sleeves 43, 44 upon rotation of the rotary shaft 17 and act as a screw pump to thereby draw lubricant from the lubricant source 29 (FIG. 1) through the conduit 31 into the lubrication chamber 46, and thence between the rotary shaft 17 and the sleeves 43, 44 to be delivered to the bearings 35, 36 which are to be lubricated. To the left of bearing 35 shown mounted on the rotary shaft 17 is a bladed oil slinger 56 that rotates with the rotary shaft 17 and directs lubricant that passes through the bearing 35 downwardly through an opening 58 in the tubular member 24 to thereby allow the return of lubricant to the lubricant source 29 in the housing 12 after the lubricant has passed through bearing 35 and lubricated the same. Positioned to the right of bearing 36 is a bladed oil slinger 57 which functions in the same fashion as bladed oil slinger 56 and re-delivers lubricant through opening 59 to the lubricant source or reservoir 29. Positioned at either end of the tubular element 24 are rotary seal assemblies 61, 62 which include carbon seal face members 63 and 64 which engage the back sides of bladed oil slingers 57 and 56 respectively.

Although this invention has been illustrated and described in connection with the particular embodiment illustrated, it will be apparent to those skilled in the art that various changes may be made therein without departing from the spirit of the invention as set forth in the appended claims.

I claim:

1. A self-priming high speed screw pump lubrication assembly, including in combination, a rotary shaft mounted in the inner races of a pair of spaced apart bearings to be lubricated, the outer races of said bearing pair positioned against the inner surface of a tubular member fitted in a housing, a source of lubricant stored within said housing, a pair of rotary seal means positioned on said tubular member and between said tubular member and said rotary shaft, such that said rotary shaft passes therethrough, said pair of bearings located between said rotary seal means, first and second concentric sleeves positioned on said rotary shaft and between said bearings, said sleeves spaced apart thereby creating a lubrication chamber formed by said rotary shaft said sleeves and said tubular member, said sleeves each have a portion formed such that said sleeve only contacts said outer race of said bearings to be lubricated, biasing means positioned between said sleeves to thereby force said sleeves against said outer bearing races, a conduit coupled to and through said tubular member having one end in communication with said lubrication chamber and another end in communication with said source of lubricant, said rotary shaft having oppositely threaded surfaces thereon in the region of said sleeves, said threaded portions in cooperation with said sleeves upon rotation of said rotary shaft acting as a screw pump to thereby draw lubricant from said source of lubricant through said conduit into said lubrication chamber and thence cause said lubricant to flow in a direction between said rotary shaft and said sleeves to be delivered toward said bearings to be lubricated and thereafter returned to said source of lubricant in said housing, the diameter of said rotary shaft having said threaded portions being greater than the diameter of said rotary shaft passing through said inner races of said pair of bearings, said rotary shaft having position thereon a pair of bladed oil slingers at a point adjacent to said bearings and on a side opposite to the direction of said lubricant flow, said oil slingers being located within said tubular member and concentrically mounted in respect to said rotary shaft.

2. The lubrication system of claim 1 wherein said tubular element has a pair of openings each adjacent said pair of oil slingers to thereby allow the return of lubricant to said lubricant source in said housing after said lubricant has passed through said bearings and lubricated same.

3. The lubrication assembly of claim 2 wherein said tubular member is resiliently mounted in said housing at at least two points remote from each other to thereby isolate said lubrication system and said rotary shaft from said housing as said rotary shaft operates over a range of speeds.

4. The lubrication assembly of claim 3 wherein said rotary shaft has ends extending from said rotary seal, said end adopted for connection to high speed impeller elements to thereby provide a self-priming high speed screw pump lubrication assembly free of lubricant carrying capillaries.

* * * * *